United States Patent [19]

Balmat

[11] 4,200,523
[45] Apr. 29, 1980

[54] PROCESS FOR REMOVING SULFATE IONS FROM AQUEOUS STREAMS

[75] Inventor: Jean L. Balmat, Kennett Square, Pa.

[73] Assignee: E. I. Du Pont de Nemours and Company, Wilmington, Del.

[21] Appl. No.: 29,527

[22] Filed: Apr. 12, 1979

Related U.S. Application Data

[63] Continuation-in-part of Ser. No. 889,563, Mar. 23, 1978, abandoned.

[51] Int. Cl.$^2$ .............................................. C02C 5/10
[52] U.S. Cl. ........................................... 210/4; 210/8; 210/11; 210/18
[58] Field of Search ...................... 210/2, 8, 3–6, 210/11, 16, 18, 12, 42 R, 45, 50, 51–53; 423/140, 142, 147, 561 R, 571

[56] References Cited

U.S. PATENT DOCUMENTS

| | | | |
|---|---|---|---|
| 3,300,404 | 1/1967 | Howe et al. | 210/16 |
| 3,740,331 | 6/1973 | Anderson et al. | 210/53 |

FOREIGN PATENT DOCUMENTS 1014280  7/1977  Canada .................................... 210/16

OTHER PUBLICATIONS

Postgate, J., "Sulphate Reduction by Bacteria"; Annual Review of Microbiology 13; pp. 505–520 (1959).
Tuttle, J. H. et al.; "Sulphate Reduction in Acid Mine Water"; Appl. Microbiology, vol. 17, No. 2, pp 297–302 (Feb. 1969).
Chambers, L. A. et al.; "Thiosulfate and Trithionate Intermediates"; Journal of Bacteriology; vol. 123, No. 1; pp. 36–40 (Jul. 1975).
Tuttle, J. H. et al.; "Sulfur Reduction by Marine Bacteria"; Journal of Bacteriology; vol. 115; pp. 732–737 (Sep. 1973).

*Primary Examiner*—Benoit Castel

[57] ABSTRACT

Sulfate ions contained in aqueous streams essentially free of organic carbon such as sulfuric acid streams are converted into more recoverable form by subjecting the stream to the action of sulfate-reducing bacteria in an inorganic, anaerobic system in the presence of an excess of calcium carbonate and converting the resultant sulfide ions into an undissolved vapor or solid phase to facilitate recovery.

7 Claims, 1 Drawing Figure

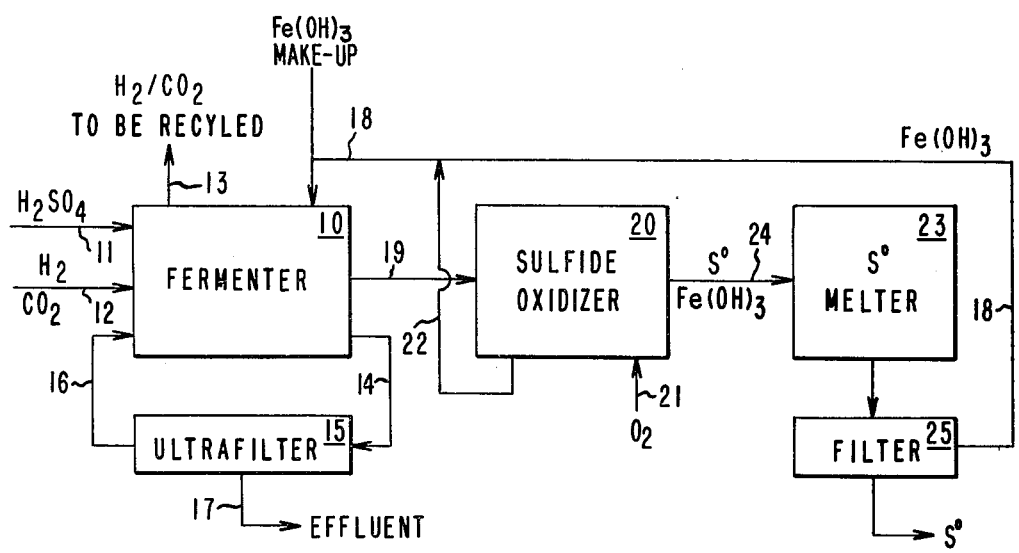

PROCESS FOR REMOVING SULFATE IONS FROM AQUEOUS STREAMS

CROSS-REFERENCE TO RELATED APPLICATION

This application is a continuation-in-part of copending application Ser. No. 889,563, filed Mar. 23, 1978, now abandoned.

DESCRIPTION

Technical Field

This invention relates to processes for the removal of sulfate ions from aqueous effluents. In particular, the invention is directed to processes for removing sulfate ions from dilute aqueous effluents in such manner that the sulfur values are removed in a manner which is not damaging to the environment.

Background Art

Because of the pre-eminent importance of sulfuric acid as a chemical of commerce, probably the most widespread single inorganic pollutant in industrial waste streams is the sulfate ion. Although it has been quite feasible economically to remove more concentrated sulfuric acid-containing waste streams for further uses, it has been prohibitively expensive to recover sulfate ions from dilute streams. Consequently, the most prevalent method of dealing with such sulfate-containing aqueous wastes has been to neutralize them with lime, thus precipitating the sulfate as calcium sulfate, which is then removed from the water. Unfortunately, the calcium sulfate from such waste neutralization has essentially no economic value and must be relegated to use as a landfill or just piled in mountainous heaps. Even the use of neutralized sulfates as landfill is not free from problems such as pollution of streams due to leaching of the fill, low soil-bearing strength and land availability.

Thus, from an environmental standpoint, there is a need for an economical process for removing sulfate ions from aqueous wastes, especially dilute aqueous wastes, and concentrating them into a form which can be recycled for use and which results in minimum environmental problems.

Neither the biological treatment of industrial wastes nor, in particular, the use of sulfate-reducing bacteria to reduce sulfate to sulfide form is new. Both are, in fact, rather well known. For example, a study by Hsu and Rice showed that sulfate removal from acid mine water could be carried out biologically by sulfate-reducing bacteria, the rate being primarily a function of the concentration of organic substrate used. [*Proceedings of the 25th Industrial Waste Conference,* Purdue Univ., Lafayette, Ind., pp 662–672 (1970)]. Woodley et al. have described the anaerobic lagoon treatment of chemical wastes containing high amounts of organics (500–12,000 lbs BOD/Surface Area). However, they indicate that such lagoons can be operated successfully only if the influent sulfate level is kept below 100 mg/1. [*Proceedings of the 26th Industrial Waste Conference,* Purdue Univ., Lafayette, Ind., pp 844–856 (1971)]. Along these same lines, Tuttle et al. describe the removal of sulfate from mine drainage waters by microbial reduction to sulfides and precipitation as FeS. A mixed culture of microorganisms and degraded wood dust cellulose were used as carbon and energy sources. [*Applied Microbiology,* Feb. 1969; pp 297–302 (1969)].

Biological treatment has also been used for the removal of other ionic species. For example, U.S. Pat. No. 3,941,691 to Romanenko et al. teaches the use of *Bacterium dechromaticans* under anaerobic conditions to remove chromates and bichromates for industrial effluents mixed with domestic sewage. In addition, unexamined Japanese Patent Application No. 50041-767 discloses the absorption of $NO_x$ and $SO_x$ into a solution containing facultative anaerobes to effect microbiological reduction to N and $H_2S$.

However, despite the extensive work in the area of microbiological reduction of industrial wastes in general and of sulfate-containing wastes in particular, such processes to date (1) have been intolerant of high pH fluctuations which are typical of industrial effluents; (2) have been limited to quite low anion concentrations; (3) have required substantial amounts of organic matter as a source of energy and (4) necessitated the disposal of substantial amounts of solids as landfill.

With respect to item (3) above, such a process, wherein a sulfate-reduction reaction is carried out only with organic matter for both carbon for growth and as oxygen acceptor for energy, results in organic waste byproducts (usually low molecular weight organic acids) being in the waste stream. Thus, such a prior art process has merely exchanged an inorganic pollution problem for an organic one. The separation of low molecular weight acids from an aqueous waste stream is typically a difficult and expensive operation.

BRIEF DESCRIPTION OF THE DRAWING

The drawing shows an illustrative flow diagram of the process of the invention in conjunction with a sulfur recovery method.

DISCLOSURE OF THE INVENTION

According to the present invention, there is provided a process for removing dissolved sulfate ions from an aqueous stream comprising the steps of (a) contacting the sulfate-containing stream which is essentially free of organic materials with at least 4 gram moles of gaseous hydrogen per gram-ion of sulfate, at least 0.003 gram mole of gaseous $CO_2$ per gram-ion of sulfate, and an aqueous anaerobic mixed liquor containing group Desulfovibrio sulfate-reducing bacteria, trace nutrients, and a suspension of calcium carbonate to maintain a mixed liquor pH of between about 5.5–8, said contacting conducted at a temperature between 0° and 60° C. for a time sufficient to convert the sulfate ions to sulfide ions; (b) removing the sulfide ions from the mixed liquor by transforming them into either a vapor or solid phase; and (c) separating the sulfide-containing phase from the mixed liquor.

The core of the process of the invention is, of course, the aqueous mixed liquor in which the reduction of the sulfate ions to sulfite ions and then to sulfide ions takes place. This mixed liquor uses the calcium carbonate suspension as a buffer.

The mixed liquor is primarily a vehicle for maintaining the viability of the sulfate-reducing bacteria and thus must contain, in addition to water as the dispersing medium, trace nutrients, gaseous hydrogen as the oxygen acceptor for the reduction reaction and gaseous $CO_2$ as a source of bicarbonate ions for biosynthesis (cell growth). The mixed liquor, as well as the sulfate-containing stream treated, are essentially free of organic materials such as sewage, sawduct and other waste carbon materials described in the prior art. The present process may contain incidental amounts of organic materials as impurities, but none is purposely added to the process either to the mixed liquor or to the sulfate-containing stream.

Sulfate-reducing bacteria use sulfate as an electron acceptor in a manner analogous to the use of molecular oxygen by aerobic organisms. However, the ability to use sulfate ions as an electron acceptor is confined to the comparatively small group of autotrophic microbes of the group Desulfovibrio and particularly *Desulfovibrio desulfuricans*. Another useful species from this group is *Desulfovibrio orientis*. The nutritional requirements of this species of organism require carbon for growth and an oxygen acceptor for energy. In the present invention, these requirements are accomplished simply, namely (1) dissolved $CO_2$ which forms the bicarbonate ion which is assimilated by the bacteria as a source of carbon to effect cell growth, (2) hydrogen which is oxidized during the sulfate-reduction reaction and thus releases energy which is utilized by the organisms and (3) the trace nutrients phosphorus, nitrogen and iron. Members of the Desulfovibrio group are free-living organisms which enjoy a wide distribution in nature. Since they are the principal naturally-occurring biological agents of sulfide formation, they are found in all natural anaerobic environments when sulfate ions are present. While Desulfovibrio group bacteria are preferred, other sulfate-reducing bacteria can be used. Other such bacteria include the Clostridium group, especially *Clostridium nigrificans*.

It is, of course, well known that the pH condition of such biomasses must be kept within fairly narrow ranges of pH lest the organism be killed. The pH range is from about 5.5-8, preferably about 6.5-7.5. Because the range is quite small, the use of biological sulfate-reducing has heretofore been quite limited to application for quite dilute aqueous wastes and/or those which have no significant variation either in pH or in flow volume. Unfortunately, effluent systems are rarely of such a nature. It is therefore one of the advantages of the process of the invention that quite wide variation in the volume and pH of the effluent feed can be tolerated without killing the microorganisms. This is accomplished by having present in the fermenter a suspension of calcium carbonate that will neutralize any excess acidity (forming calcium sulfate), thereby maintaining the proper pH level. The calcium carbonate acts to counteract a slug of acid which will drop the pH to an unacceptably low level. The calcium carbonate is added directly to the fermenter.

Within the fermenter or bioreactor, i.e., within the aqueous dispersion of neutralized sulfate-containing feed and bacteria, the reduction of $SO_4^=$ to $S^=$ occurs in multiple steps. The pathway from $SO_4^=$ to $SO_3^=$ is well characterized:

$SO_4^=$ + adenosine triphosphate $\rightleftarrows$ adenosine phosphosulfate + pyrophosphate (ATP sulfurylase)

$H_2O$ + pyrophosphate $\rightarrow$ 2 phosphate (pyrophosphatase) adenosine phosphosulfate + 2e $\rightleftarrows$ adenosine monophosphate + $SO_3^=$ (APS reductase)

The pathway from $SO_3^=$ to $S^=$ may involve several steps. Enzymes which may participate in the pathway have been purified from the organisms, but their involvement has not been directly demonstrated. The overall reduction is shown by the following equation:

$3H_2 + SO_3^= \rightarrow S^= + 3H_2O$.

Though the precise mechanism of this reaction is not known, one proposed pathway is given in the equation which follows:

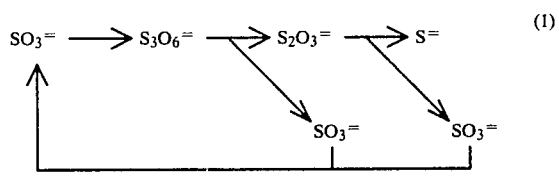

(1)

The temperature of the mixed liquor within the fermenter should be maintained within the range of from about 0°–60° C. and preferably 0°–40° C.; the optimum temperature is about 38° C. Furthermore, this limitation must be observed, not only with respect to the average temperature of the mixed liquor, but on a localized basis as well. Thus, by using a proper dispersion of the feed in the fermenter, localized temperature increases can be minimized.

Carbon dioxide is, of course, an essential ingredient of the mixed liquor since it is the primary source of carbon for growth of the bacterial cells. All of the $CO_2$ requirements of the fermenter will be furnished by passing a stream of $CO_2$-containing inert gas through the mixed liquor. For example, an inlet gas produced by combustion of a hydrocarbon in a rich mixture with air is suitable. Such a stream typically contains mainly $CO_2$ and $N_2$ and quite minimum amounts (below 0.5% vol.) of CO. The amount of $CO_2$ which must be available for assimilation by the bacteria is a minimum of about 0.003 gram mole $CO_2$ per gram-ion of $SO_4^=$ reduced in the system. Since the minimum amount depends on many factors, there must be at least this amount of gaseous $CO_2$ added. However, there will usually be an excess amount of $CO_2$ bubbled through the mixed liquor which then is continuously recycled.

The amount of hydrogen needed as an oxygen acceptor in the fermenter is a direct function of the amount of sulfate in the system, as follows:

$$CaSO_4 + 4H_2 \rightarrow CaS + 4H_2O \qquad (2)$$

Thus, at least 4 gram moles of hydrogen are used per gram-ion of $SO_4^=$ reduced in the system. High purity hydrogen is not required for use in the process of the invention and most commonly available industrial hydrogen streams are quite satisfactory. For example, hydrogen derived by removal of most of the CO from synthesis gas and the circulatory hydrogen stream from platinum reformers are both satisfactory. The hydrogen can either be fed as a separate stream into and through the mixed liquor or, preferably, passed through the mixed liquor in the same stream as the $CO_2$.

The product of the biological reduction of the sulfate ion is, of course, the sulfide ion which is dissolved in the mixed liquor. It is necessary to convert the dissolved sulfide ion into a nondissolved form in which it can be removed from the mixed liquor so that it can be recycled to the fermenter. One way of doing this is contact the effluent from the fermenter after removal of the bacteria with steam to strip out the sulfide as $H_2S$ gas as follows:

$$CaS + 2H_2O \rightleftarrows H_2S \uparrow + Ca(OH)_2 \qquad (3)$$

A preferred method is to treat the sulfide-containing mixed liquor with ferric hydroxide [Fe(OH)₃] to form ferric sulfide, which is insoluble in the mixed liquor and can be removed by centrifugation or filtration. An extension of this method is illustrated in the drawing wherein the ferric sulfide is oxidized to elemental sulfur, which is removed from the system. Ferric hydroxide is regenerated and recycled to the fermenter.

The mixed liquor after precipitation of the sulfide with ferric hydroxide contains substantial amounts of calcium hydroxide:

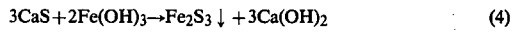

$$3CaS + 2Fe(OH)_3 \rightarrow Fe_2S_3 \downarrow + 3Ca(OH)_2 \qquad (4)$$

This amount of $Ca(OH)_2$ must then be reacted with sufficient $CO_2$ to return it to the bicarbonate form and thus render it effective to neutralize the feed entering the fermenter. For this reason, the amount of $CO_2$ passed to the fermenter must not only be sufficient to provide the growth requirements of the bacteria as discussed hereinabove, it must also be sufficient to react with substantially all of the calcium hydroxide to form the bicarbonate:

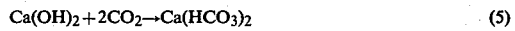

$$Ca(OH)_2 + 2CO_2 \rightarrow Ca(HCO_3)_2 \qquad (5)$$

With reference to the drawing which shows a proposed commercial flow sheet, an initial quantity of mixed liquor as described above is placed in fermenter 10. Fermenter 10 is an enclosed vessel or pond which can be operated in an oxygen-free environment. A dilute sulfuric acid-containing stream essentially free of organic materials is continuously fed into fermenter 10 via line 11 along with excess hydrogen and carbon dioxide which is bubbled into the mixed liquor in fermenter 10 via line 12. The excess hydrogen and carbon dioxide is removed from the top of fermenter 10 by line 13 and recycled to the fermenter.

Hold-up time in the fermenter only has to be sufficient to convert the sulfate ions to sulfide ions. Since the sulfate reduction reaction is fairly rapid at 20°–40° C., normal nonturbulent flow through the fermenter is usually sufficient.

A portion of the mixed liquor is continuously withdrawn from the bottom of fermenter 10 by line 14 and fed to ultrafilter 15 where the sulfate-reducing bacteria and other solid materials, such as ferric sulfide, are retained in some of the mixed liquor and recycled to fermenter 10 by line 16. The liquid effluent from the ultrafilter, i.e., most of the mixed liquor minus solids, is discharged to waste by line 17.

Ferric hydroxide is added to fermenter 10 by line 18 in an amount sufficient to form insoluble ferric sulfide from the produced sulfide ions in the mixed liquor. A portion of the mixed liquor containing ferric sulfide is removed from fermenter 10 by line 19 for recovery of the sulfur and iron values.

In the embodiment illustrated, the sulfide content is recovered as elemental sulfur. The ferric sulfide-containing mixed liquor in line 19 is fed to an enclosed oxidizing vessel 20 where an oxygen-containing gas (e.g., pure oxygen or air) is bubbled into the mixed liquor by line 21 to convert the ferric sulfide to elemental sulfur and ferric hydroxide. Sulfide-free mixed liquor is removed from oxidizer 20 by line 22 and recycled to fermenter 10, preferably joining recycle ferric hydroxide in line 18.

The oxidation of sulfide to sulfur is well known in the art. For example, hydrogen sulfide can be oxidized to sulfur as described in French Pat. No. 852,369 and British Pat. No. 731,696. Aqueous sulfide is oxidized as described by K. Y. Chen and J. C. Morris, 5th International Water Pollution Research Conference, July-August 1970, "Oxidation of Aqueous Sulfide by Oxygen," and in *Environmental Science and Technology,* "Kinetics of Oxidation of Aqueous Sulfide by Oxygen," Vol. 6, 1972, pages 529–537.

The mixture of sulfur and ferric hydroxide is fed through line 24 to melter vessel 23 operated at a temperature above the sulfur melting point. The sulfur becomes molten and is removed from the stream by filter 25, leaving the ferric hydroxide to be returned to fermenter 10 via line 18.

BEST MODE—EXAMPLES

The invention can be further understood by referring to the following example in which parts and percentages are by weight unless otherwise indicated.

Example

Two 1-liter resin kettles were used as fermenters to compare an organic carbon sulfate reduction with a $H_2/CO_2$ inorganic system sulfate reduction. Each kettle was heated in a thermostatically controlled water bath so as to keep the mixed liquor at about 38° C., and was equipped with a sparging gas bubbler immersed in the mixed liquor and a paddle stirrer operated by an air motor to keep the mixed liquor in motion without violent agitation.

Each kettle was filled with one liter of aqueous mixed liquor derived from earlier work which contained *Desulfovibrio desulfuricans* bacteria. The mixed liquor in the kettles had the following compositions:

| Ingredients (g/l) | Kettle 1 Organic Carbon Run | Kettle 2 $H_2/CO_2$ Run |
|---|---|---|
| $H_2SO_4$ (conc.) | 1.08 | 1.08 |
| Sodium lactate | 2.72 | — |
| $FeCl_3 \cdot 6H_2O$ | 0.005 | 0.005 |
| $PO_4^{3-}$ | 0.02 | 0.02 |
| $NH_4Cl$ | 0.04 | 0.04 |
| Bacto . Tryptone (Protein) | 0.02 | 0.02 |
| Yeast extract | 0.02 | 0.02 |

One teaspoon of powdered calcium carbonate was added to each kettle.

The sulfate-containing feed stream to each fermentation kettle was initially of the same composition as the mixed liquor. Each feed stream was pumped from an iced reservoir to the kettle by a Cole-Parmer Variable Speed Masterflex Pump fitted with a 7013 pump head. A feed stream flow of one liter/day was obtained by a low pump speed setting and 2 minute on-off interval timer. The level of mixed liquor in each kettle was controlled by a Cole-Parmer Dyna-Sense Liquid Level Controller that operated a Merco Matic diaphragm chemical pump. Effluent from each kettle was pumped through a glass frit biological filter immersed in the mixed liquor to allow removal of liquid effluent while retaining bacteria and solid matter in the kettle. For the organic system, 30 ml/min of 100 percent helium was used as the sparging gas whereas for the inorganic system a stream of hydrogen and carbon dioxide (50:50 molar ratio) was fed through the gas sparger at the same rate which provided an excess of both hydrogen and $CO_2$.

After continuous operation for about one week, the feed composition to each kettle was changed by increasing the sulfuric acid content to 5.8 g/l. For the organic system, the sodium lactate in the feed was increased to 13.6 g/l. The sulfate-reduction in each kettle was carried out continuously for several weeks with an occasional teaspoon of powdered calcium carbonate added to each kettle when it was visually ascertained that the calcium carbonate particles in the mixed liquor were getting depleted. Following are the conditions that prevailed during this latter period prior to shutting down the fermenters:

| Conditions | Organic System | Inorganic System |
|---|---|---|
| $SO_4^=$ concentration in feed | 5850 ppm | 5850 ppm |
| Feed flow rate | 420 ml/day | 420 ml/day |
| $SO_4^=$ loading | 0.026 mole/day | 0.026 mole/day |
| Bacterial concentration | 784 ppm | 362 ppm |
| pH of feed | 3.0 | 1.2 |
| pH of effluent | 7.5 | 7.0 |
| $SO_4^=$ concentration in effluent | 40 ppm | 160 ppm |
| $SO_4^=$ removal | 99.3% | 97.2% |

The settling rate of the effluent was too slow to measure which means separation of bacteria from the effluent will have to be by centrifugation or pressure filtration rather than by sedimentation. The difference in the $SO_4^=$ concentration of the effluents is believed to be due to the difference in the biological populations of the two systems. The above results show that the inorganic feed supports a bacterial population of about 50% of that in the organic feed. However, the rate constant (k) of $SO_4^=$ reduction with $H_2$ is two times the rate of the reduction with organic carbon as the oxygen acceptor.

I claim:

1. A process for removing dissolved sulfate ions from an aqueous stream comprising the steps of
   (a) contacting the sulfate-containing stream which is essentially free of organic materials with at least 4 gram moles of gaseous hydrogen per gram-ion of sulfate, at least 0.05 gram mole of gaseous $CO_2$ per gram-ion of sulfate, and an aqueous anaerobic mixed liquor containing group Desulfovibrio sulfate-reducing bacteria, trace nutrients, and a suspension of calcium carbonate to maintain a mixed liquor pH of between about 5.5-8, said contacting conducted at a temperature between 0° and 60° C. for a time sufficient to convert the sulfate ions to sulfide ions;
   (b) removing the sulfide ions from the mixed liquor by transforming them into either a vapor or solid phase; and
   (c) separating the sulfide-containing phase from the mixed liquor.

2. The process of claim 1 wherein the separated mixed liquor is recycled to step (a).

3. The process of claim 1 wherein the pH of the mixed liquor is in the range of about 6.5-7.5 and the sulfate-containing stream is aqueous sulfuric acid.

4. The process of claim 1 wherein at least part of the sulfide ions are derived from soluble salts and are removed from solution and transferred into the solid phase by mixing $Fe(OH)_3$ with the mixed liquor by which water-insoluble iron sulfides are formed and which are removed from the mixed liquor.

5. A process for removing dissolved sulfate ions from an aqueous stream comprising the steps of
   (a) continuously feeding the sulfate-containing stream essentially free of organic materials, at least 4 gram moles of gaseous hydrogen and at least 0.05 gram mole of gaseous $CO_2$ per gram-ion of sulfate to an oxygen-free fermentation zone containing an aqueous anaerobic mixed liquor containing group Desulfovibrio sulfate-reducing bacteria, phosphorus, nitrogen and iron nutrients and a suspension of calcium carbonate to maintain the pH of the mixed liquor between about 6.5-7.5, said fermentation zone maintained at a temperature in the range of about 0°-40° C.;
   (b) continuously contacting the sulfate-containing stream, hydrogen, carbon dioxide and mixed liquor for a time sufficient to convert sulfate ions to sulfide ions;
   (c) continuously feeding ferric hydroxide to the fermentation zone and forming ferric sulfide therein;
   (d) continuously removing from the fermentation zone a portion of the mixed liquor containing ferric sulfide, removing ferric sulfide from the mixed liquor and recycling the mixed liquor to the fermentation zone; and
   (e) continuously removing from the fermentation zone a second portion of the mixed liquor, retaining the solids from this portion and returning them to the fermentation zone and discharging liquid effluent.

6. The process of claim 5 wherein the sulfate-containing stream is aqueous sulfuric acid.

7. The process of claim 1 or claim 5 wherein the bacteria are *Desulfovibrio desulfuricans*.

* * * * *